May 7, 1968

R. HORNLEIN ET AL 3,381,631

INSTALLATION FOR THE PRODUCTION
OF HOLLOW CHOCOLATE BODIES

Filed Sept. 28, 1965

BY *Craig & Antonelli*

ATTORNEYS

May 7, 1968

R. HORNLEIN ET AL 3,381,631

INSTALLATION FOR THE PRODUCTION
OF HOLLOW CHOCOLATE BODIES

Filed Sept. 28, 1965

BY *Craig & Antonelli*

ATTORNEYS

United States Patent Office

3,381,631
Patented May 7, 1968

3,381,631
INSTALLATION FOR THE PRODUCTION OF HOLLOW CHOCOLATE BODIES
Roland Hörnlein, Schwabisch Gmund, and Gerold Domhan, Waldstetten, Kreis Schwabisch Gmund, Germany, assignors to Walter Hornlein Metallwarenfabrik KG, Schwabisch Gmund, Germany
Filed Sept. 28, 1965, Ser. No. 490,912
Claims priority, application Germany, Oct. 6, 1964, H 53,954; Aug. 20, 1965, H 56,922, H 56,923
32 Claims. (Cl. 107—8)

ABSTRACT OF THE DISCLOSURE

An installation for the production of hollow chocolate bodies, having an endless conveying path for a plurality of individually three-dimensionally rotatable mould frames arranged in a row endlessly one behind the other, with common conveying means for the common further conveying of the mould frames and common drive means for the three-dimensional rotation of the mould frames, also with arrangements for the halting of the mould frames in their three-dimensional rotational movements.

Background of the invention

Installations are known for the production of hollow chocolate bodies, in which the mould frames either are only constantly rotated about one axis and at the same time pivoted back and forth, or are rotated spasmodically alternately about two axes disposed transversely of one another. It has appeared that uniform wall thicknesses are not achieved by such inconstant three-dimensional rotational movements in the case of many chocolate bodies, which frequently have a very complicated form.

In other known installations of the initially stated kind, the mould frames are in each case rotatably seated on the obliquely angled-off ends of rods, which themselves are rotated and moved along a conveying path. By the rotation of the rods the axes of their obliquely angled rod ends are moved slowly along a cone periphery, while the mould frames are rotated about the axes of the rod ends, independently thereof. The rotational movement of the mould frames is halted due to the fact that a drive wheel seated on the rod in each case lifts itself away from a rotational drive chain. This installation has the disadvantage that the three-dimensional rotational movements do not take place about two axes disposed perpendicularly to one another. Moreover the installation is suitable only for specific working actions, namely for the distribution and setting of the chocolate mass within the mould. The emptying and filling of the mould must however take place in each case outside the installation. The moulds must be introduced into the installation and removed from it by hand.

Summary

The problem upon which the invention is based consists in providing an installation with which uniformly moulded chocolate bodies can be produced in a simple and rapid manner. This is achieved according to the invention due to the fact that each mould frame is rotatably mounted in a carrier fork, which is arranged rotatably about its fork central spindle on a conveying trolley movable along the endless conveying path and can be set in rotation by the rotational-drive means, about a transverse spindle extending transversely of the fork central spindle through the fork heads, and is in drive communication with the same rotational drive means through at least one of the pivot bearings, the conveying path comprising a series of working stations, for example for unlocking and opening the moulds, withdrawal of the moulded chocolate bodies, insertion of wrapping foils, filling of chocolate mass, closing and locking of the mould frames, through which the mould frames are passed, being further held and conveyed by the carrier forks which in the meantime are halted in their rotational movement about the fork central spindle and prevent a rotational movement of the mould frames about the fork transverse spindle.

In this manner the mould frames can be set individually and constantly in rotation about two axes disposed transversely of one another, so that the distribution of the chocolate mass takes place more uniformly than in the known installations, where the rotation about the second axis takes place spasmodically or in which the moulds are merely pivoted back and forth in the second plane of movement. The main advantage of the invention consists however in that the mould frames in the carrier forks can even be passed through the individual working stations without any activity having to be performed in any way by hand. In the known installations this is not possible, because either the mould frames are surrounded by external carrier frames which do not permit opening of the mould frames, especially if hinged frames are concerned, or do not reliably permit the halting and resetting in rotation of the mould frames, or cannot introduce the moulds exactly into working stations as a result of rather unsupervisable diagonal movements.

In the installation according to the invention the mould frames are conveyed in cadence, commonly from station to station of the chain of working stations, and if necessary halted individually in their rotational movements during the stationary times between conveying, while the mould frames which do not come to a halt between conveying and working stations are still three-dimensionally rotated. More expediently the mould frames are approximately uniformly three-dimensionally rotated during conveying and during the rest times between conveying.

The endless conveying path can be formed by rails or slideways. The carrier forks for the mould frames are preferably mounted in the conveying trolleys with the fork central spindle lying approximately horizontal. The common conveying means and rotational-drive means can be cables or ropes. They are more expediently an endless drive chain in each case. In further development of the invention these two drive chains possess drives coupled with one another in such manner that the difference of movement between the conveying chain and the rotational-drive chain is approximately the same when conveying is not taking place and in the conveying movement of the mould frames. More expediently the conveying chain and the rotational-drive chain run in the same direction and are driven by one common drive, which runs appropriately faster during the conveying movement of the mould frames, for the maintenance of the desired movement difference. Here the conveying trolley is brought out of engagement with the conveying chain during the interval times between conveying, so that when the conveying trolley is stationary and the rotational-drive and conveying chains are running at half speed, only the rotational drive of the carrier forks takes place at the halting points situated outside the working stations.

In the case of an endless conveying path comprising two parallel longitudinal runs, it is possible for example to permit the conveying chain to run around the endless conveying path, but to provide two rotational drive chains which are conducted in planes lying perpendicular to the plane of the conveying chain, around deflecting wheels in each case. More expediently however both the conveying chain and the rotational-drive chain run approximately parallel with one another in two planes lying one above the other around the endless conveying path in each case, so that the mould frames can be rotated further even in the reversing regions.

The arrangements for the halting of the mould frames in three-dimensional rotational movements consist more expediently in that on the conveying trolley there is mounted an externally controllable coupling part engagable with the conveying chain. This part can be operated by a cam control.

In the installation according to the invention it is especially advantageous that here the mould frames remain firmly clamped in the installation during the entire course of work, and do not leave it. With the exception of the halts at the working stations the mould frames are in a constant three-dimensional motion and at the same time in vibration, which can be achieved with simple means. This together provides an optimum of uniformity of the wall thickness of the hollow chocolate bodies. The transport of the conveying trolleys takes place step by step, that is to say the conveying trolleys travel the distance from the one working position to the next, in order then to wait there for the running off of a time relay, which is adapted to the time requirements of the working programme. The intermittent further conveying is effected by the coupling and uncoupling of the coupling part, mounted on each conveying trolley, with the conveying chain. The rotational-drive connection between the carrier fork or the pivot bearings carrying the mould frame and the rotational-drive chain is constantly present. Only the carrier fork or mould frames of the conveying trolleys situated at the working stations are prevented from three-dimensional rotation by the engagement of blocking pins, which is rendered possible by a slipping clutch, while all other mould frames continue to rotate as before.

A further essential development of the invention concerns the arrangements of the working stations for the opening and/or closing of the mould frames where hinged frames are used. These, without their lower part being disengaged from the carrier fork in each case, should be opened and after several working stations closed again. At the intermediate working stations the finished chocolate bodies are withdrawn, new wrapping foils inserted and chocolate mass filled.

In order to avoid the otherwise usual manual opening and closing of the hinged frames, according to the invention a new method is applied for the mechanical opening and/or closing of the hinged frames in such installations. This consists in that with the lower frame part held fast mechanical action is exerted upon the upper-frame part at points on both sides lying on a parallel axis arranged offset in relation to the hinge spindle of the frame, and this parallel axis is then rotated about the hinge spindle of the frame. In this manner the upper frame part is entrained and pivoted upwardly in relation to the lower frame part.

In order that this method may be carried out more advantageously, according to the invention dogs or the like are mounted on both sides on the upper part of the hinged frame offset in relation to the hinge spindle of the frame, and at the frame-opening and/or frame-closing station there are arranged driven grippers which can grip the dogs or the like and are rotatable about the hinge spindle of the frame when the lower frame part is held fast. These grippers can be of various constructions. For example they can be movable in the direction of the dog axis lying parallel with the frame hinge axis and in this direction of movement can come into and out of engagement with the dogs. More expediently the grippers are made such that both in the closed position of the frame and also in the open position of the frame, preferably pivoted through 180°, they can be brought into and out of engagement with the dogs or the like of the upper frame part. In further development of the invention the grippers are formed as rail pieces, preferably of U-shaped cross-section, along which the dogs or the like of the upper frame part slide from one end to the other and can come into and out of engagement at each end. This is an especially preferred solutiton, since the grippers do not have to be moved towards one another in order to act on the dogs, but are moved in the same direction of movement transversely of the frame hinge spindle. The rail pieces preferably have a U-shaped cross-section, between the arms of which the dogs slide. It is however also possible in place of a dog in each case to use for example two noses, between which there slides a rail piece of strip form. In place of the noses it is also possible for strip pieces to be seated on the hinged frame or for appropriate recesses to be provided.

In substantial further development of the invention the driven grippers, rotatable about the frame hinge spindle, are seated on the free ends of two pivot arms arranged in pairs and pivotable about a spindle lying parallel with the frame hinge spindle, so that by pivoting in of the pivot arms they can come into engagement with the dogs or the like of the upper frame part and after their rotational movement, pivoting the upper frame part away from the lower part, are disengagable again from the dogs or the like by repivoting out of the pivot arms. For the closing of the hinged frame the movement proceed conversely. In this manner the grippers can be brought extremely simply into and out of engagement with the dogs. More expediently here the pivot axis of the pivot arms lies approximately perpendicularly beneath the frame hinge spindle at a distance amounting to a multiple of the distance between frame hinge spindle and the axis of the dogs or the like, and the pivot arms are pivotable out of this position away from the lower frame part into a position in which the hinged-up frame can be moved further in the direction of the frame hinge spindle to the next working station without hindrance.

On the pivot arms there is more advantageously arranged a cylinder/piston drive, the piston rod of which drives the grippers preferably through a chain drive. More expediently two endless chains are used for this purpose, which are conducted on the one hand over chain wheels connected with the grippers and on the other hand over counter-wheels in each case. According to the invention, in further improvement, the counter-wheels of the two endless chains are secured on one common shaft. Thus the disturbing influence of a different chain elongation is partially compensated. This is important in order to avoid tilting of the frame parts in opening. For this reason furthermore the locks of the endless chains, connected through a transverse rod with the piston rod, are more expediently so arranged that when the frame is closed they are situated close above the counter-wheels and move away from these counter-wheels on opening of the frame.

A further essential development of the invention concerns the working stations for the locking and/or unlocking of the mould frames, which can be unlocked and after several working stations locked again, without their lower part being disengaged from the carrier fork in each case. At the same time or directly thereafter or therebefore the frames are opened or closed by the above-described frame-opening or closing device. At the working stations lying therebetween the finished chocolate bodies are withdrawn, new wrapping foils are inserted and chocolate mass is filled.

In order to avoid the hitherto usual manually effected opening and closing and the unlocking and locking carried out at the same time, according to the invention work is carried on by a new method. This consists in that for the especially favourable mechanical unlocking and/or locking of the mould frames, especially of hinged mould frames, mould frames are used having upper and lower parts which are sprung in relation to one another and lockable. The upper portion of the frame is resiliently mounted with respect to the lower portion by way of rods in such a manner that, without being locked, it is slightly open and must be pressed onto the lower portion, against the spring force, in order to close the lock. Thereby, the upper and lower portions rest upon each other under pressure in the locked condition. As soon as the latch is released the upper portion again unfolds slightly. In order that this method may be carried out favourably, according to the invention at the frame-unlocking and/or locking station there are arranged a holding-down element which presses upon the upper part and is operated by a controllable drive and stop elements which engage on the locking elements of the mould frame and bring these out of and into their locking position and are actuated by a controllable drive.

By the use of such frames with sprung upper and lower parts, which in their constructional development are not the object of the present application, in combination with the holding-down element according to the invention, the advantage is achieved that the locking elements can be disengaged simply and quickly and with avoidance of great friction forces, the locking force, that is to say the force which holds the locking elements in their locking position, being applied by the mutual springing of the upper frame part in relation to the lower part. This springing and the frame parts are so dimensioned that the frame halves lie one upon the other under spring pressure in the closed condition.

More expediently the holding-down element consists of a lever-like claw pivotably mounted in a machine frame, the free end of which claw loads the upper frame part and is connected with a drive, preferably a cylinder/piston drive. Such a claw can easily be pivoted in and out, in order to engage on the upper part or, in the case of use of hinged frames, after the unlocking not to hinder the pivoting up of the upper part in relation to the lower part. It would be possible to mount such lever-like claws about an approximately vertical pivot spindle and to provide them at their free end with a wedge-shaped charging surface, through which the desired pressure force is exerted upon the upper frame part. However in a preferred style of embodiment of the invention the lever-like claw is pivotable about an approximately horizontal spindle and in the charging position is preferably aligned approximately parallel with the upper side of the upper frame part, so that it can be applied to the upper frame part in a very protective manner and quickly and without application of lateral displacement forces.

In further development of the device according to the invention—where at least two pivotable locking elements are used on the frame—the stop elements are seated on a pair of levers, the individual levers of which are in each case pivotably mounted and engage with one common drive element. Preferably here the locking elements and the levers charging them are pivoted simultaneously but in opposite directions of rotation for unlocking and locking. This renders possible an especially simple construction of the drive elements, which in further development of the invention consists in that each lever engages through a toothed segment with a common rack which is seated on a drive, preferably a cylinder/piston drive. This solution has the very great advantage that the unlocking device of the installation needs to be modified only quite slightly in comparison with the locking device, and except for quite a small number of parts can be assembled from the same components. If for example the locking elements for the locking pivot towards one another in the direction of the central axis of the frame, then in the unlocking device the levers pivoting outwards for unlocking are mounted in the region between the locking elements and engage with their toothed segments with a narrow rack lying in the middle, while in the locking device the pivot spindles of the levers which pivot inwards for locking are placed outwards and the toothed segments engage with a correspondingly widened rack. Thus in the locking device in comparison with the unlocking device it is only necessary for the pivot spindles of the levers provided with the toothed segments to be shifted somewhat outwards and the rack to be made somewhat wider. However the same levers, the same holding-down element, the same rack drive and the same rack guidance can be used in both devices.

More expediently the stop elements or levers are movable or pivotable outwards so far into a rest position lying oppositely to their working position, that the unlocked or locked frames can be moved further or brought up without hindrance in the same support plane on slide rails leading through all working stations.

Further details and advantages of the invention will appear from the following description of an example of embodiment which is represented diagrammatically in the accompanying drawings, wherein.

Figure 1:
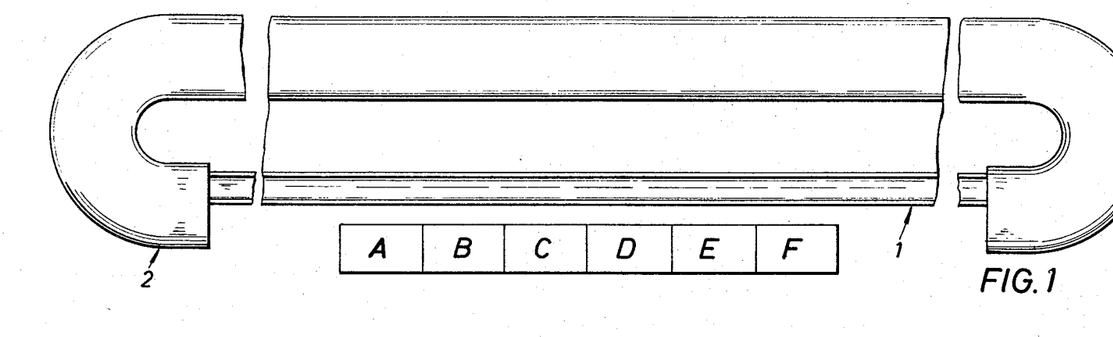
FIGURE 1 shows a plan view of the installation according to the invention, in a diagrammatic sketch of principle.
Figure 2:
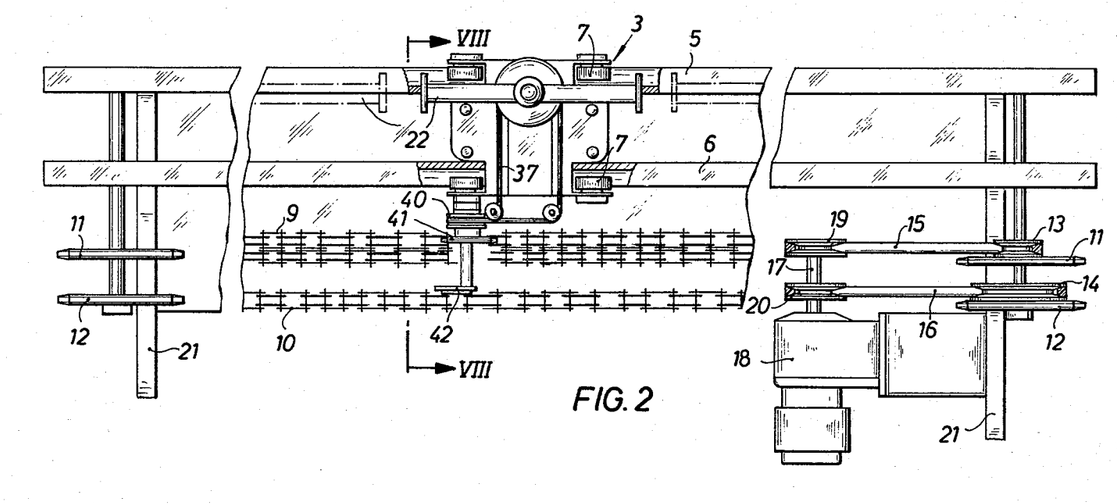
FIGURE 2 shows a lateral elevation of the installation.

In the drawings, the installation as illustrated in FIGURES 1 to 8, consists essentially of an endless conveying path designated as a whole by 1, around which, along the major part of its length as illustrated diagrammatically by FIGURE 1, there is placed a cooling channel 2, of a row of working stations A, B, C, D, E, F and also of a number of conveying trolleys designated as a whole in each case by 3, which are arranged in a row on the conveying path 1 and in the manner described further below each carry a mould frame 4 for the reception of moulds for the production of one or more hollow chocolate bodies.

Figure 3:
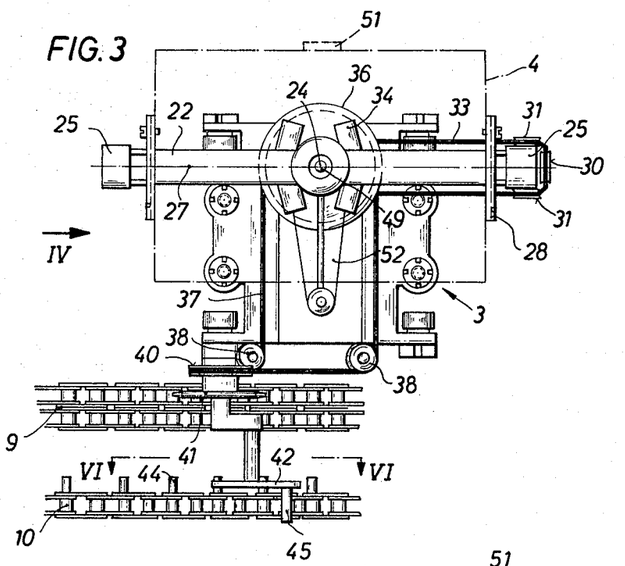
FIGURE 3 shows a lateral elevation of a conveying trolley in the same direction of view as in FIGURE 2, but shown on a somewhat larger scale, with parts of the drive chains.
Figure 4:
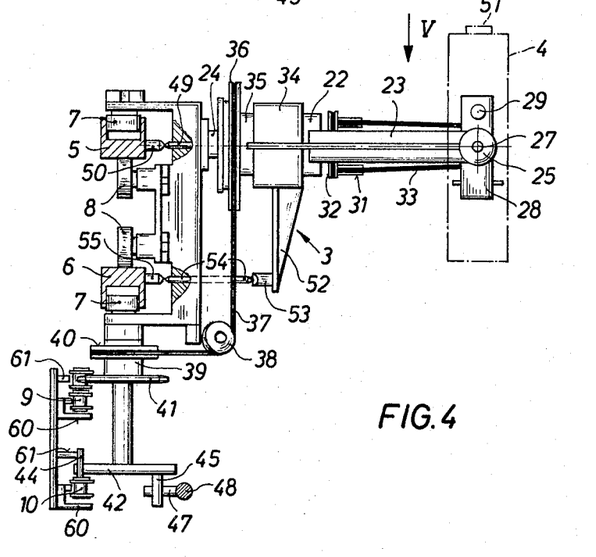
FIGURE 4 shows an end view in the direction of the arrow IV in FIGURE 3, with parts of the conveying path and drive chains.
Figure 5:
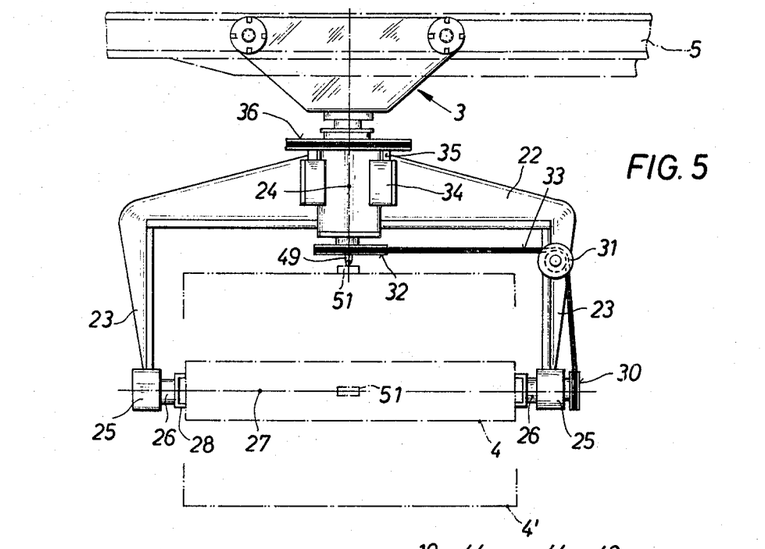
FIGURE 5 shows a plan view in the direction of the arrow V in FIGURES 2 and 4.

These mould frames are indicated in each case only in dot-and-dash lines in FIGURES 3 to 5. They can be hinged frames provided with hinged elements, as shown in greater detail in FIGURES 13 and 14.

At the individual working stations A . . . F the following is carried out: at the first station A the hinged mould frame, which shortly previously was blocked in its rotational movement in a horizontal readiness position, is unlocked and hinged open. At the next station B the finished hollow bodies situated in the now opened mould frame are lifted by means of a withdrawing device out of the frame and deposited for example on a conveyor belt (not shown). At the next station C now new foils, such as are subsequently to wrap such chocolate bodies in the ordinary way, are laid into the mould halves. At the station D the exact weighed quantity of liquid chocolate mass is injected into the foils lying in the lower half of the mould by means of a quantity-regulating arrangement. At the station E the closing of the mould frame takes place. The station F is a reserve station. The arresting of the mould frame can take place here for example. It can also be omitted or still further stations can be added. The individual arrangements of which the manner of operation was just described can be of known style, at least as regards the withdrawal of the finished chocolate bodies, the insertion of the wrapping foils and the introduction of the regulated quantity of liquid chocolate mass. The arrangements serving for these purposes are therefore omitted in the drawing, for the sake of simplicity, and will not be described hereafter. The frame-opening and unlocking device and also the frame-closing and locking device are illustrated in FIGURES 9 to 12.

After the closing of the mould frame the rotational movement is released again and the conveying trolley 3 now travels the free section of the cycle until after a series of intermittent conveying movements, for example twenty steps, it again arrives at the working stations and the just-described working proceduure recommences afresh.

The conveying path 1 consists of two endless rails 5, 6 or U-shaped cross-section lying one above the other, in which there engage rollers 7, 8 rotatably arranged on the conveying trolley 3. A rotational-drive chain 9, formed as a double chain, and a conveying chain 10 extend all round parallel with the rails 5, 6. These two chains are guided at the corner points of the installation over deflecting chain wheels 11, 12. In the manner which may be seen from FIGURE 2, in each case a belt pulley 13, 14 is secured to two of these deflecting wheels 11, 12, which are rotatable independently of one another. Each of these belt pulleys is in connection through a belt 15 and 16 respectively with a belt pulley 19 and 20 respectively secured on the shaft 17 of an electric motor 18. As motor 18, which is flanged on to a frame 21 also carrying the rails 5, 6, there is selected a two-stage motor with the rotation speed ratio of 1:2. It is however also possible for separate, alternately engageable drive systems to be provided for the two chains 9, 10. The belt pulley 14 is made larger than the belt pulley 13, so that the deflecting chain wheel 12 of the conveying chain 10 is driven more slowly than that of the rotational-drive chain 9. The transmission ratio is such that the speed of the rotational-drive chain 9 is twice as great as that of the conveying chain 10. For example a chain speed of about 4 m./min. is selected for the rotational-drive chain, in order to bring the chocolate mass to flow in a favourable manner in the rotation of the moulds. When the conveying trolleys 3 are stationary the rotational-drive chain 9 runs around for this purpose with a speed of 4 m./min., while the separately driven conveying chain 10 runs around at 2 m./min. as a result of the step down ratio of 1:2, without however entraining the conveying trolleys, since these are uncoupled from it in the manner described below. If now the command for the next conveying step is given by a time relay arrangement (not shown) the common drive motor 18 is switched over to double rotation speed and thus to double speed of the two chains 9, 10, so that now the rotational-drive chain 9 runs at 8 m./min., while the speed of the conveying chain 10 is also doubled from 2 to 4 m./min. Simultaneously with the switch-over command all the conveying trolleys 3 couple themselves to the conveying chain 10. The conveying trolleys, now moved forwards at 4 m./min., are overtaken at 4 m./min. by the rotational-drive chain 9 moving at 8 m./min., so that the relative chain speed acting as rotation drive upon the mould frames again amounts to 4 m./min. This condition persists until the next station is reached and a switch-over command again switches the drive motor 18 back to half rotation speed, while the conveying trolleys are uncoupled from the conveying chain 10.

The conveying trolley 3, which can be seen best from FIGURES 3 to 7, possesses a carrier fork 22 receiving the mould frame 4 in each case, which fork is mounted rotatably in the conveying trolley about its central spindle 24, which is parallel with the fork arms 23. The arrangement of the conveying trolley and the carrier fork 22 is such that this central spindle 24 is directed approximately horizontally. A pivot bearing piece 26 in each case is rotatably arranged about a transverse spindle 27 lying transversely of the fork central spindle 24 in the fork heads 25 in a manner not illustrated further. The pivot bearing pieces 26 are provided with coupling rails 28 and an arresting device indicated in FIGURE 4 at 29 for the coupling and uncoupling of the mould frames 4. On a pivot bearing piece 26 there is seated a belt pulley 30 over which there runs an endless drive belt 33 leading over deflecting pulleys 31 to a belt pulley 32 arranged on the fork central spindle 24. The belt pulley 32 is secured on the carrier fork 22. On the latter there are arranged slipping clutch elements 34, which work for example with sprung synthetic plastics material slipping pieces 35, which elements are pressed against a belt pulley 36 mounted rotatably independently of the carrier fork 22 on the fork central spindle 24. The plastic slip pieces 35 of the slipping clutch are resiliently supported in the usual manner so that they are resiliently pressed against a clutch disk or the like. This belt pulley 36 is in drive connection through an endless belt 37, with interposition of obliquely placed deflecting pulleys 38, with a belt pulley 40 rotatably mounted about a spindle 39 arranged perpendicularly on the conveying trolley. With his belt pulley 40 there is connected a chain wheel 41 which meshes constantly with the upper part of the rotational drive chain 9. With the lower part of this rotational drive chain 9 the deflecting chain wheels 11 engage at the corner points of the endless conveying path.

Figures 6, 7:
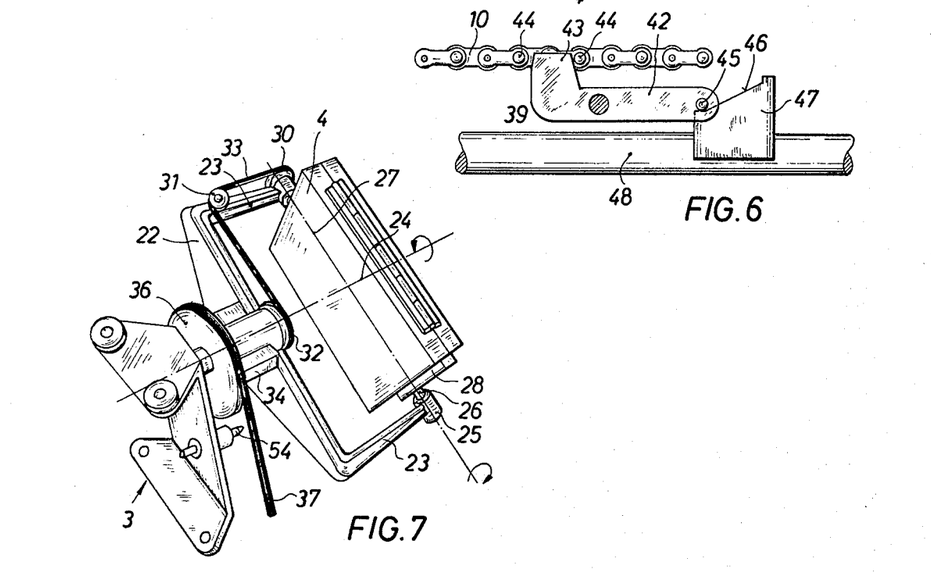
FIGURE 6 shows a partial section along the line VI—VI in FIGURE 3.
FIGURE 7 shows the essential parts of the conveying trolley with the carrier fork in perspective view.

On the same spindle 39, but offset by a distance, beneath the chain wheel 41 a coupling lever 42 is pivotably articulated, which engages with a nose 43 between pins 44 in the manner visible from FIGURE 6, which pins are arranged on every second articulation point between the chain links of the conveying chain 10. At the other end of the double-armed coupling lever 42 there is secured a pin 45 which cooperates with a run-up path 46 of a control cam 47. These control cams 47 are displaceably seated on a rod 48 which is also carried by the frame 21, in the manner indicated in FIGURE 8. The arrangement of the control cams 47 corresponds to the internal of the individual conveying trolleys 3. The rod 48 is rotatable about its axis, so that the control cams 47 are pivotable into and out of the path of movement of the pin 45 of the coupling lever 42. According to this, the coupling lever 42 is brought into or out of engagement with the conveying chain 10, so that accordingly the conveying trolley is moved further with the conveying chain 10 or remains stationary. Due to the mobility of the control cams 47 on the rod 48 the stepping length of the conveying movement can be altered and adjusted exactly again after any elongation of the chain. This is important especially in the case of the conveying movements of the conveying trolleys at the working stations, where the movements must take their course with maximum accuracy.

The chain wheel 41 engages constantly with the rotational drive chain 9, which also is constantly driven. The belt pulley 36 on the fork central spindle 24 thus rotates constantly. The carrier fork 22 is rotated through the slipping clutch elements 34 and thus also is the belt pulley 32, which thus drives the belt 33. Through the belt 33 again the belt pulley 30 arranged on the fork transverse spindle 27 is rotated. The mould frame 4 coupled into the coupling rails 28 of the pivot bearing pieces 26 is thus simultaneously rotated about the transverse spindle 27 and about the fork central spindle 24 perpendicular thereto. The same position of the mould frame 4 is entered in dot-and-dash lines in each case in FIGURES 3 to 5. In FIGURE 5 in addition there is illustrated in dash-double-dotted lines at 4' the position of the mould frame 4 rotated through 90°.

It is necessary to bring the mould frame 4 into a horizontal readiness position shortly before the working stations. This is achieved by a consecutive action of two catches, which firstly block the rotation of the mould frame 4 about the transverse spindle 27 and thereupon the rotation of the carrier fork 22 about the fork central spindle 24. The first mentioned catch consists of the blocking pin 49 visible in FIGURE 4, which is mounted in the fork central spindle 24, formed as hollow shaft, and is pressed resiliently against a run-up rail 50 arranged on the rail 5 on the conveying path along the working stations. This pin cooperates with a stop nose 51 on the mould frame 4. Shortly before the working stations the run-up rail 50 commences, as indicated in dash-double-dotted lines in FIGURE 5. The blocking pin 49 runs up on to it and is moved outwards into the range of rotation of the mould frame 4, so that the latter in its next passage strikes with its stop nose 51 upon the head of the blocking pin 49 and is halted. In FIGURE 5, where the blocking pin 49 is shown in the blocking position, this will take place after rotation of the mould frame 4 shown in dot-and-dash lines into the dash-double-dotted position 4'.

For the blocking the rotational movement of the carrier fork 22 the latter is provided with a transverse arm 52 protruding perpendicularly of the fork arms 23 and fork central piece, which transverse arm carries a stop nose 53 at the forward end and co-operates with a second blocking pin 54 arranged beneath the blocking pin 49, which pin 54 can run on a second run-up rail 55 arranged on the lower rail 6 of the conveying path along the working stations and be moved outwards into the rotation range of the fork transverse arm 52. The run-up rail 55 commences shortly behind the run-up rail 50, so that the rotational movement of the carrier fork 22 is blocked immediately after the blocking of the rotational movement of the mould frame 4 about the transverse spindle 27. Meanwhile the belt pulley 36 is driven constantly still and when the carrier fork 22 is blocked the slipping clutch elements 34 slip with their slip pieces 35. Thus a drive force is constantly transmitted to the carrier fork 22, by which the stop nose 53 of the fork transverse arm 52 is pressed constantly against the head of the protruding blocking pin 54. The same is the case in the interim between the striking of the stop nose 51, situated on the mould frame 4, upon the blocking pin 49 and the blocking of the carrier fork 22. In this short interval the belt 33 is driven further and thus presses the stop nose 51 upon the head of the blocking pin 49. This achieves the object that the mould frame 4, both as regards the spindle 27 and as regards the spindle 24, comes in exactly horizontal orientation into the working stations, where in the manner described initially it is hinged open by the opening device explained further below for the removal of the finished chocolate hollow body. The run-up rails 50, 55 extend to the entire range of the working stations. Behind their end the blocking pins 49, 54 move back again and the drive force can again be transmitted fully through the slipping clutch elements 34 from the belt pulley 36 to the carrier fork 22, so that the latter can be rotated again about its central spindle 24 and the mould frame 4 can be rotated again about the transverse spindle 27.

Figure 8:
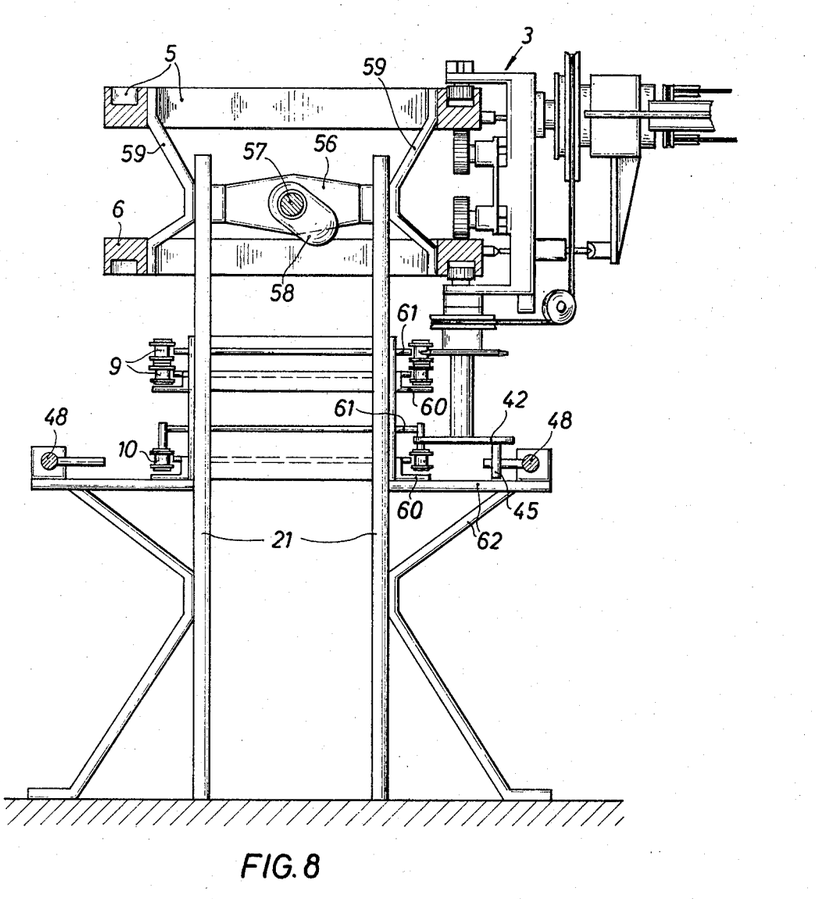
FIGURE 8 shows a diagrammatic cross-section along the line VIII—VIII in FIGURE 2 through the entire installation.

In FIGURE 8 there is shown a cross-section through the frame 21 and a part of the conveying trolley 3. The frame 21 consists of a series of supports which are connected with one another at intervals through transverse beams 56. In these transverse beams, along the conveying path, there are mounted one or more shafts 57 with eccentric weight discs 58. The eccentric weight discs are adjustable. Thus vibrations can be produced in a simple manner, which are desired in order to distribute and keep liquid the chocolate mass, also for simultaneous evening out of air bubbles and thicker portions. With the unbalanced shaft 57 there is associated a drive motor (not shown) an additional modification of the vibration is possible by a variation of rotation speed of the motor. The generated vibration is transmitted through the bearings in the transverse beams 56 and through connection beams 59 to the rails 5, 6 and through these to the conveying trolleys 3 and finally to the mould frames 4. On the frame 21 there are also secured carrier rails 60 and guide rails 61 for the chains 9, 10. These rails are also indicated in FIGURE 4. The control rods 48 are also mounted through connection beams 62 in the frame 21.

With the installation according to the invention it is also possible in a simple manner, if greater throughput quantities are necessary, to elongate the installation by the use of intermediate pieces in accordance with the principle of prefabricated units, and then to increase the speed of one working cadence considerably. Co-operation with packing machines and similar additional devices can also be carried out readily, so that a fully automatic overall production plant is obtained.

Within the scope of the invention it is naturally also possible to effect many kinds of modifications to the example of embodiment as illustrated in FIGURES 1 to 9. For example the arrangements for halting the mould frames 4 and conveying trolleys 3 in their conveying movements can in a simple manner also consist in that the conveying chain is halted. The conveying trolleys can then be in constant engagement with the conveying chain 10. The arrangements for halting the mould frames and carrier forks in their three-dimensional rotational movements can also work magnetically for example, instead of mechanically with blocking pins.

Figure 13:
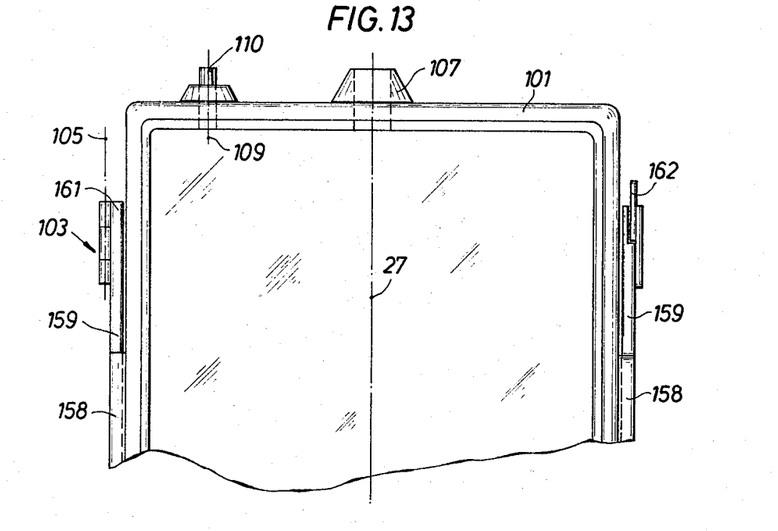
FIGURE 13 shows a plan view of a part of a hinged frame used for preference, on an enlarged scale.
Figure 14:
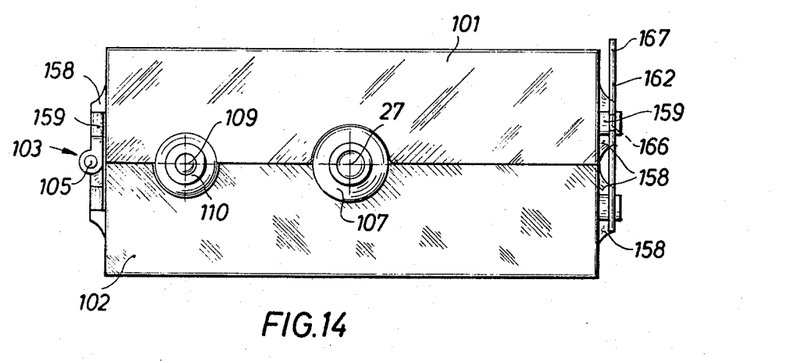
FIGURE 14 shows a lateral elevation of one end of the hinged frame according to FIGURE 13.

The mould frame used in accordance with the invention are hinged frames according to FIGURES 13 and 14 and consist of an upper part 101 and a lower part 102, which are connected along their one longitudinal side with one another through a hinge 103, while there is a locking arrangement on the other longitudinal side. This consists of two catch hooks 162, which are articulated to the two free ends 161 of a bar 159 secured in the middle on the lower frame part 102 between the longitudinal ribs 158 and co-operate in each case with the roller 166, which rollers are arranged on the free end of a corresponding bar 159 secured on the upper part 101 (see FIGURES 11 and 13, 14). The catch hooks 162 possess a hook nose 165 at their free end, which can engage behind the roller 166 in each case of the upper frame part. In closing here the springing of the bars 159 is utilised, so that the catch hook 162 is securely firmly seated. At the end of the hook nose 165 there is a protruding extension 167, which protrudes out over the frame and on which the unlocking and locking device according to the invention acts. At the other end, beside the attachment bolt, the catch hook has a stop nose 168, which in the opened condition of the catch hook comes to abut on the relevant bar 159 and limits the opening position of the catch hook. This opening position is entered in dot-and-dash lines in FIGURE 11.

On the other longitudinal side of the frame the hinge parts are seated on the free ends 161 of similar bars 159, which also are secured in the middle between longitudinal ribs 158 in the one case on the lower frame part and in the other on the upper frame part. The frame halves are here so dimensioned that in the closed condition they rest on one another under spring pressure. Due to the length of the longitudinal ribs 158 the spring force of the bars 159 can be selected very exactly within the available elasticity range.

On the lower frame part 102 on the longitudinal central spindle of the frame there is situated a pivot bearing dog 107, through which the mould frame is rotatably mounted in the above-described carrier fork 22.

Figure 10:
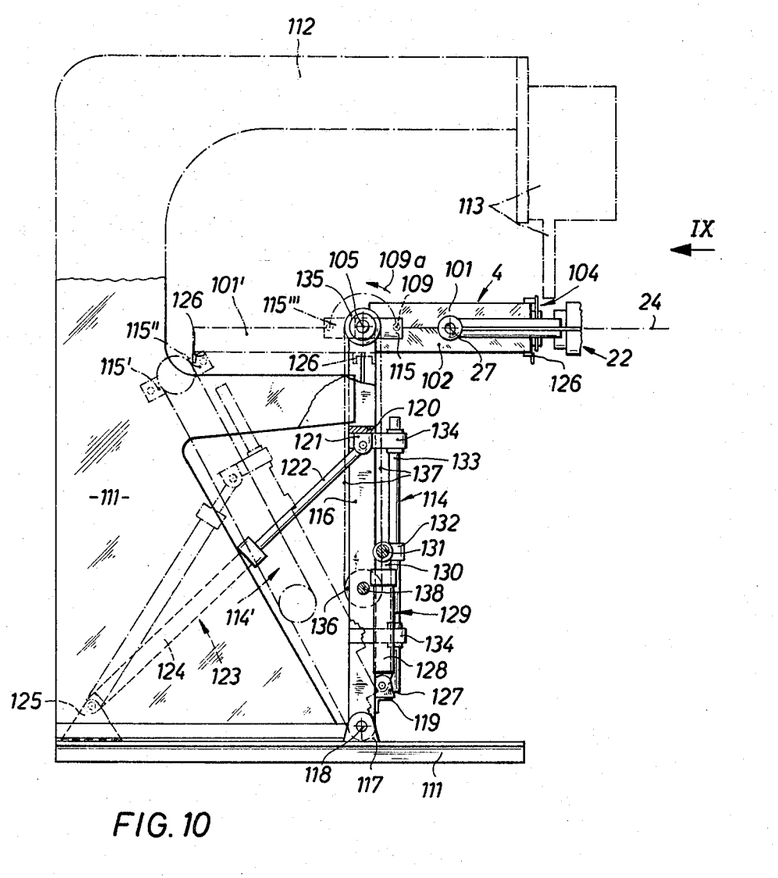
FIGURE 10 shows a lateral elevation of the device according to FIGURE 9 in the direction of the frame hinge axis, partially in section along the line X—X in FIGURE 9, with inserted hinged frame and a part of the carrier fork holding the hinged frame, in the installation for the production of the chocolate bodies.
Figure 11:
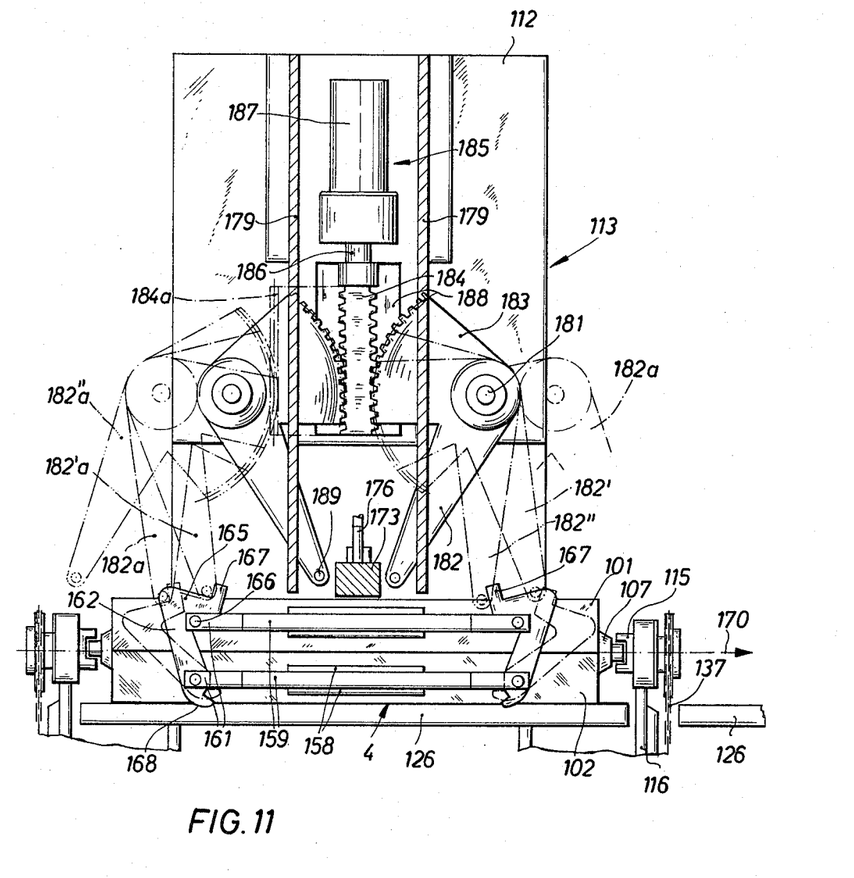
FIGURE 11 shows the essential parts of the unlocking device according to the invention, which form a part of the frame-opening device according to FIGURES 9 and 10, in section along the line XI—XI in FIGURE 12.

This frame longitudinal central spindle thus lies on the transverse spindle 27 of the carrier fork, as represented in FIGURES 10–14. In FIGURE 11 the carrier fork is omitted. The fork central spindle 24 is also entered in FIGURES 10 and 12.

On the upper part 1 of the hinged frame, on the two narrow sides lying transversely of the longitudinal side of the hinge, dogs 110 are arranged on a parallel spindle 109 lying offset in relation to the hinge spindle 105 of the frame. According to the invention for the opening of the hinged frame mechanical action is exerted on these dogs 110. Thereupon the parallel spindle 109, on which the dogs 110 lie, will be pivoted in the direction of the arrow 109a entered in FIGURE 10, through 180° about the frame hinge spindle 105. In this position the upper frame part as illustrated in dot-and-dash lines at 101′ in FIGURE 10, lies beside the lower part 102, so that the hinged frame is opened for the withdrawal of the chocolate bodies and for the insertion of wrapping foils and chocolate mass. The closing of the hinged frame takes place in the converse manner.

The frame opening device according to the invention as shown in FIGURES 10 and 11 consists essentially of a machine stand 111, which carries the unlocking and locking device according to FIGURES 11 and 12 as described further below, designated as a whole by 113, on an upper arm 112, and of a pivoting arrangement designated as a whole by 114 with driven grippers 115, rotatable about the frame hinge spindle 105, which act on the dogs 110 of the upper frame part 101.

Figure 9:
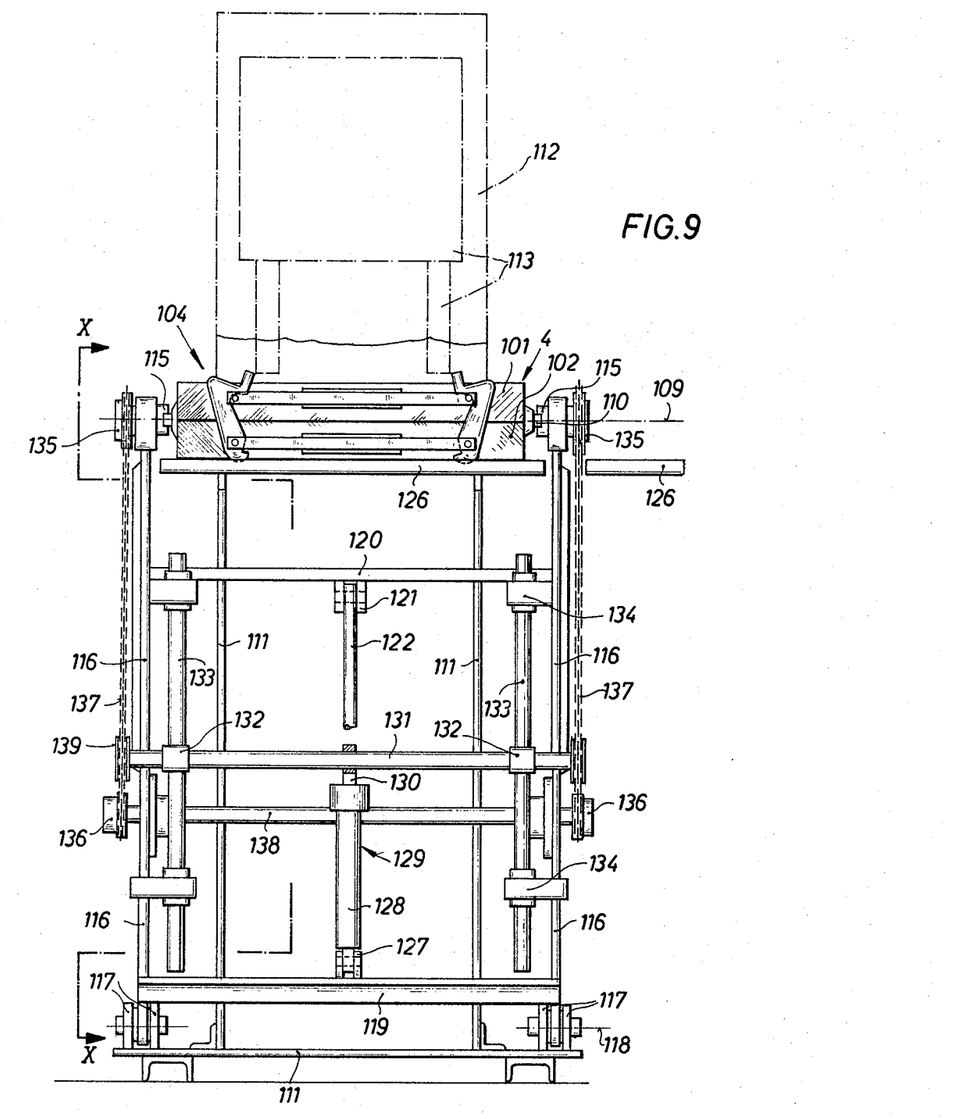
FIGURE 9 shows the frame opening device according to the invention at the frame opening station of the installation, in lateral elevation, transversely of the frame hinge axis in the direction of the arrow IX in FIGURE 10, with inserted hinged frame, but without carrier fork, which holds the lower part of the hinged frame fast.

The unlocking and locking device 113, mounted on the arm 112 of the machine stand 111, is indicated only in dot-and-dash lines of FIGURES 9 and 10. It co-operates with the catch hooks of the locking device mounted on the hinged frame and designated as a whole by 104, in order to disengage this so that the upper frame part 101 can be pivoted up in relation to the lower part 102.

The pivoting arrangement 114 possesses two pivot arms 116, which are rotatably mounted about an axis 118 lying parallel perpendicularly beneath the frame hinge spindle 105, in bearing brackets 117 secured on the machine stand 111. The distance of the axes 105 and 118 is a multiple, for example 10 to 15 times, of the distance between the spindles 105 and 109, so that the grippers 115 rotatably mounted on the free end of the pivot arms 116 can come into and out of engagement with the dogs 110 by approximately rectilinear movement. The pivot arms 116 are connected with one another through a lower transverse rod 119 and an upper transverse rod 120. On the latter there is mounted a bearing bracket 121, on which there is articulated the free end of the piston rod 122 of a cylinder/piston drive designated as a whole by 123, the cylinder 124 of which is pivotably mounted in a bracket 125 secured on the machine stand 111. This cylinder/piston drive 123 serves for the pivoting of the pivoting arrangement 114 out of the vertical position 114 as shown in FIGURE 10, in which the hinged-open frame can be pushed further without hindrance on rails 126 to the next working station. This further movement is effected by the further movement of the carrier fork 22, with which the lower frame part 102 remains connected.

On the lower transverse rod 119 connecting the two pivot arms 116 there is articulated, on brackets 127, the cylinder 128 of a cylinder/piston drive designated as a whole by 129, the piston rod 130 of which acts on a transverse rod 131, which is secured through clamps 132 on guide rods 133 arranged parallel with the pivot arms 116. These guide rods are slidingly guided in mounting eyes 134 secured on the pivot arms 116.

According to the invention the grippers 115 are formed as continuously open U-rail pieces, so that the dogs 110 of the upper frame part 101 can slide in and out at each end. These U-rail pieces are rotatably mounted on the free end of the pivot arm 116 in each case and connected in each case with the chain wheel 135. An endless drive chain 137 in each case leads over these chain wheels 135 and a counter-chain wheel 136 in each case. The counter-chain wheels are secured on a common shaft 138, which is rotatably mounted in the pivot arms 116. The chain locks 139 of the two endless drive chains 137 are secured on the transverse rod 131, which is movable by the cylinder/piston drive 129. The supply and discharge conduits to the cylinder/piston drives 123 and 129 are not illustrated.

The device according to the invention as shown in FIGURES 9 and 10 works as follows: the hinged frame is brought by the carrier fork 22 into the position shown in solid lines in FIGURE 10. Thereupon the pivoting arrangement 114 pivots out of the position 114′ shown in dot-an-dash lines in FIGURE 10 into the vertical position, after the grippers 115 are pivoted, by operation of the cylinder/piston drive 129 through the transverse rod 131, the drive chains 137 and the chain wheels 135, out of the position 115′ shown in dot-and-dash lines in FIGURE 10 through 180° into the position 115″. Thus the U-rail pieces of the grippers 115 in the pivoting in of the pivot arms 116 slide over the dogs 110 of the upper frame part. After the unlocking of the frame locking arrangement 104 the cylinder/piston drive 129 is operated again and rotates the grippers 115 out of the position shown in solid lines in FIGURE 10 through 180° into the position 115‴, the upper frame part 101 also being rotated about the frame hinge spindle 105. Meanwhile the lower frame part 102 is prevented from partaking in the rotation by the carrier fork 22. The hinged frame is then in the open position. Thereupon the pivoting arrangement 114 is pivoted back again into the position 114′ shown in dot-and-dash lines, by operation of the cylinder/piston drive 123, so that the open hinged frame can be moved further on the rails 126 by means of the carrier fork 22 to the next working station without hindrance. In the pivoting back of the pivot arms 116 the dogs 110 slide through the U-rail pieces of the grippers 115 and issue from them at the other end. In order to faciliate this according to the invention the U-rail pieces of the grippers 115 are mounted rotatably not in their middle but at their one end, as shown by FIGURE 10.

In the described installation after the withdrawal, foil-insertion and chocolate-mass filling stations there is a second device according to the invention, which works in the converse manner. The hinged frame arrives there in the opened condition. The pivot arms 116 are pivoted into the vertical position. The grippers are here situated in the position 115′ shown in FIGURE 10. After the pivot arms 116 stand vertically, the rotation of the grippers 115 takes place into the position shown in solid lines. Thereupon the pivot arms 116 pivot back and the grippers are rotated back out of the position 115″ into the position 115′.

Several modifications of the embodiment as shown in FIGURES 9 and 10 are possible within the scope of the invention. Thus for example the U-rail pieces of the grippers 115 can be rotatably seated in guide pieces which are displaceable transversely of the frame hinge spindle 105. In place of the chain wheels 135 it would also be possible for toothed wheels to be used, which are driven for example through racks. The solution according to the invention with the pivot arms 116 excells in comparison therewith however by particular simplicity and high functional reliability, and therefore is the preferred embodiment.

Figure 12:
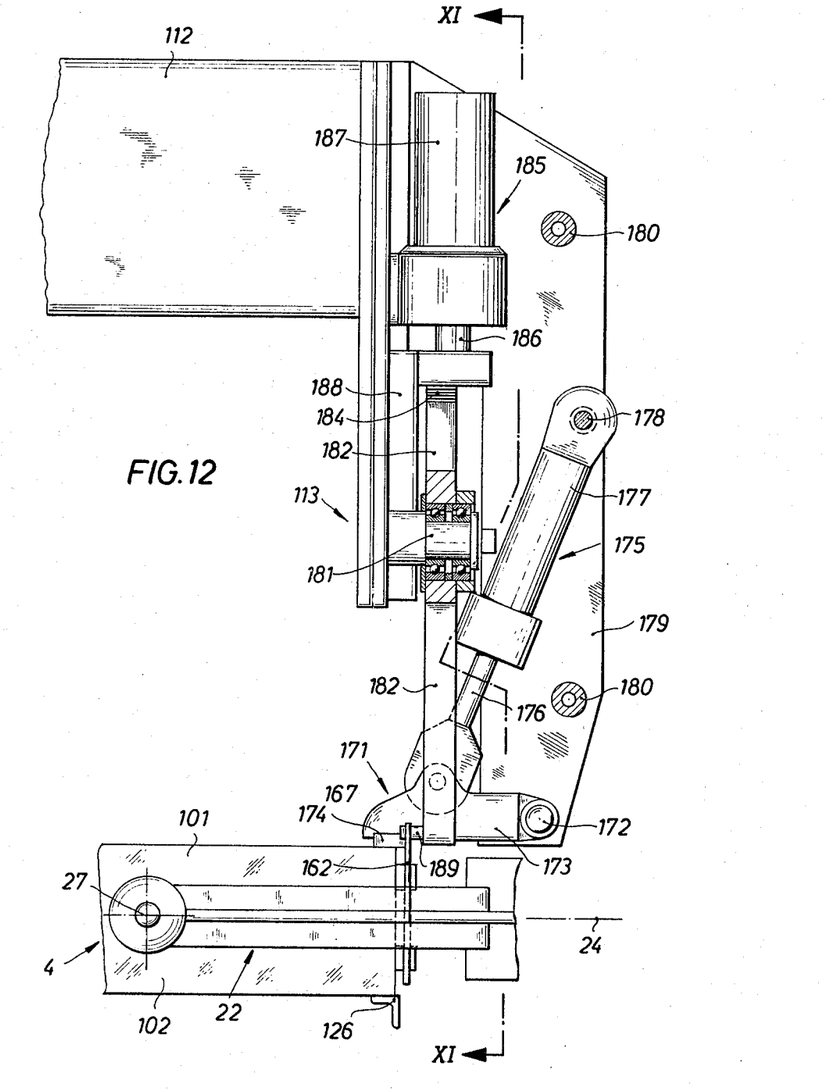
FIGURE 12 shows a lateral elevation, perpendicular to the section according to FIGURE 11, with some parts in section.

The unlocking and locking device 113 according to the invention, which is seated on the arm 112 of the machine stand 111, is illustrated in FIGURES 11 and 12. In FIGURE 11, of the above-described frame-opening device according to FIGURES 9 and 10, only the two grippers 115 engaging the dogs 110 of the upper frame part 101 are shown. In FIGURES 11 and 12 the device according to the invention is illustrated in solid lines as unlocking device.

It possesses a holding-down element designated as a whole by 171, with a claw 173 pivotable about a horizontal spindle 172, after the style of a single-armed lever, which can press at its forward free end, through a bearing nose 174, upon the upper frame part 101 in the region between the two catch hooks 162. For this purpose the claw 173 is moved by a cylinder/piston drive 175, the piston rod 176 of which is articulated on its back, while the cylinder 177 is rotatably mounted on a bolt or pegs 178, which are seated in two carriers 179 arranged with spacing from one another and secured on the machine arm 112. On these carriers, which are held apart by connection bolts 180, there is also mounted the claw 173, which extends approximately horizontally on charging of the upper frame part.

On bolts 181 secured on the machine stand there are rotatably mounted two individual levers 182 forming a lever pair, which engage in each case through a toothed segment 183 with a common rack 184 lying therebetween, which is moved by a cylinder/piston drive 185. The piston rod 186 of this cylinder/piston drive is connected with the rack 184, while the cylinder 187 is secured on the machine stand. The rack 184 is guided for upward and downward movement in guides 188 in a manner not illustrated further.

At the lower free end of the levers 182 there are bolts 189 which on appropriate pivoting of the levers come to abut on the extensions 167 of the catch hooks 162.

In FIGURE 11 of the levers 182, which pivot from the interior outwards for unlocking, are shown in solid lines in their rest position in which they are pivoted so far inwards that the locked mould frame 4 or the extensions 167 of the catch hooks 162 can be conducted through without hindrance beneath the stop bolts 189 at the level of the slide rails 126. On the right side of FIGURE 11 the position 182′ is shown in dot-and-dash lines, in which the catch hook 162 is pushed out of its locking position. The position 182″ is shown in dash-double-dotted lines, in which the stop bolt 189 is just applying itself to the still locked catch hook. Then the lever pivots back into its initial rest position out of the position 182′.

In order to prepare the device as a locking device it is merely necessary to shift the individual levers further apart, as indicated in dot-and-dash lines on the left and right in FIGURE 11, and to widen the rack accordingly. On the left side of FIGURE 11 the widened rack is indicated in dot-and-dash lines at 184a. The single levers lying further apart are designated by 182a. In the position shown in dot-and-dash lines the lever is just placing itself upon the opened catch hook 162, in order to lock the frame by pivoting from the exterior inwards. The locking is achieved when the lever is in the position 182a′, which is entered in dash-double-dotted lines. The lever then pivots back into its initial rest position 182a′, shown in dash-treble-dotted lines. The pivoting movements again proceeds so far that the locked frame with its catch hooks 162 can be moved further without hindrance through beneath the levers 182a on the slide rails 126 or at their level by means of the carrier forks 22. The manner of working is as a whole as follows:

(a) The carrier fork 22 of the installation brings the mould frame 4 on the slide rails 126 to the working station with the device according to FIGURES 11 and 12.

(b) The holding-down element 171 with the claw 173 removes the initial tension of the sprung mould frame in order to avoid unnecessary friction; thereafter the levers 182 are rotated until the catch hooks 162 are pivoted out of their locking position and the mould frame is unlocked.

(c) The opening device according to FIGURES 9 and 10 then pivots into the working position and in doing so grasp the dogs 110 with the grippers 115.

(d) By traction on the drive chain 137 the grippers 115 with the upper frame part 101 rotate through 180°, after the claw 173 was previously lifted away again.

(e) The opening device then pivots back into its initial position, disengages itself from the dogs 110 and releases the opened frame for further conveying to the next working station, where the withdrawal of the finished chocolate bodies takes place.

The manner of operation of the frame closing and locking station following several working stations, for example after the withdrawal station, foil-insertion and chocolate-mass filling stations, takes place in the sequence (a), (c), (d), (b), (e), closing taking place instead of opening and locking instead of unlocking.

We claim:

1. An installation for the production of hollow chocolate bodies, comprising an endless substantially horizontally extending conveying path, a plurality of conveying trolleys movable along said conveying path and arranged in an endless row one behind the other, first common drive means for the simultaneous conveying of said conveying trolleys along said path, a plurality of carrier forks mounted one on each of said conveying trolleys and open on one side, each of said carrier forks having two fork arms and a substantially horizontally extending fork central axis therebetween and being rotatably mounted on the respective one of said conveying trolleys about said fork central axis, on each of said carrier forks a mould frame for moulds for said chocolate bodies, said mould frame being rotatably mounted on said carrier fork about a fork transverse axis extending transversely of said fork central axis through the free ends of said fork arms, said mold frame opening toward said one side substantially perpendicular to said conveying path, bearing means on said free ends of said fork arms for said mould frame, second common drive means for the common rotation of said carrier forks each about its respective said fork central axis and of said mould frames each about its respective said fork transverse axis, said mould frames being in drive connection with said common second drive means about at least one of said bearing means, means for halting said carrier forks and said mould frames in their rotational movements, a series of working stations along said conveying path at least for unlocking and opening said mould frames, withdrawal of the moulded chocolate bodies, filling of chocolate mass, closing and locking said mould frames, said conveying trolleys with said mould frames being passed sequentialy through said working stations, said mould frames being permanently mounted on and conveyed by said carrier forks, which at said stations are halted in their rotation about said fork central axis and prevent rotational movement of said mould frames about said fork transverse axis, whereas others of said carrier forks and their said mould frames out of said working stations are further rotated for distributing the chocolate mass in said mould.

2. An installation as claimed in claim 1, comprising an endless conveying chain extending along said endless conveying path and constituting said first common drive means, and an endless rotational-drive chain extending along said endless conveying path and constituting said second common drive means, said conveying chain and said rotational-drive chain running approximately parallel with one another in two planes lying one above the other.

3. An installation as claimed in claim 2, said conveying chain and said rotational-drive chain having drive systems coupled with one another so that said rotational drive chain has a fixed constant speed relative to said conveying chain while said conveying trolleys rest and during the conveying movement of said conveying trolleys.

4. An installation as claimed in claim 2, comprising a common drive system for said conveying chain and said rotational-drive chain driving said two chains in the same direction, drive speed transformation means for driving said two chains with different speeds, control means for said drive system permitting said drive system to run faster during the conveying movement of said conveying trolleys than during the rest of said conveying trolleys in order to maintain a desired difference of movements between said rotational-drive chain and said conveying trolleys.

5. An installation as claimed in claim 1, comprising a coupling element on each of said conveying trolleys for engaging said first common drive means for conveying said trolleys, and control means for the coupling and uncoupling of said coupling element.

6. An installation as claimed in claim 5, comprising an endless conveying chain extending along said endless conveying path and constituting said first common drive means, said conveying chain having a plurality of chain links, a rotatably mounted lever on each of said conveying trolleys and constituting said coupling element, said lever having a first nose engageable between said chain links of said conveying chain and a second nose and a stationary cam control arrangement comprising a cam for said second nose arranged for disengaging said first nose out of said conveying chain by rotating said lever when said second nose runs up on said cam.

7. An installation as claimed in claim 6, comprising as said stationary cam control arrangement at least one rotatable rod extending along said conveying chain, a plurality of cam pieces which are mounted adjustably on said rod and which can be brought by rotation of said rod into the path of movement of said second nose conveyed with said conveying trolley, said cam pieces being spaced from one another according to the spaced arrangement of said conveying trolleys along said conveying path.

8. An installation as claimed in claim 5, comprising an endless conveying chain extending along said endless conveying path and constituting said first common drive means, said conveying chain comprising a plurality of chain links and connection pins there between, a series of equally spaced ones of said connection pins having a protuding portion on which said coupling element engages.

9. An installation as claimed in claim 1, comprising as said second common drive means an endless rotational-drive chain formed as a double chain comprising two chain portions arranged side-by-side, a chain wheel rotatably mounted on each of said conveying trolleys and being in rotational drive connection with said carrier fork, a motor for driving said rotational-drive chain, an axle driven by said motor, and a drive chain wheel in drive connection with said axle, said first-mentioned chain wheel engaging with the one chain portion and drive chain wheel engaging with the other chain portion of said double chain.

10. An installation as claimed in claim 1, comprising on each of said conveying trolleys a rotatably mounted drive element engaging with said second common drive means and being in rotational drive connection with said carrier fork, and a slipping clutch interposed in said rotational drive connection.

11. An installation as claimed in claim 10, comprising on each of said conveying trolleys a first belt pulley secured to said carrier fork, a second belt pulley rotatably mounted on said fork transverse axis, and a first endless drive belt running over said first and said second belt pulleys, said slipping clutch being drivingly between said drive element and said carrier fork.

12. An installation as claimed in claim 11, comprising on each of said conveying trolleys a third belt pulley connected with said drive element, a fourth belt pulley rotatably mounted on said fork central axis, and a second endless drive belt running over said third and said fourth belt pulleys, said slipping clutch being drivingly between said fourth belt pulley and said carrier fork.

13. An installation as claimed in claim 10, said means for halting said carrier forks comprising on each of said conveying trolleys a movable blocking element, a run-up portion on said carrier fork for said blocking element, and a control arrangement for said blocking element by which it is brought in and out of the way of rotational movement of said run-up portion, said blocking element being arranged for selectively blocking the rotatability of said carrier fork about said fork central axis.

14. An installation as claimed in claim 13, in which said control arrangement comprises a stationary run-up rail arranged along said working stations longitudinally of said conveying path, for the operation of said blocking element.

15. An installation as claimed in claim 1, comprising on each of said carrier forks a hollow central shaft on said fork central axis, a blocking pin movably arranged in said hollow central shaft, a run-up portion on said mould frame for said blocking pin, a control arrangement for said blocking pin by which it is brought in and out of the way of rotational movement of said run-up portion, said blocking pin being arranged for selectively blocking the rotatability of said mould frame about said fork transverse axis.

16. An installation as claimed in claim 15, in which said control arrangement comprises a stationary run-up rail arranged along said working stations longitudinally of said conveying path, for the operation of said blocking pin.

17. In system for the production of hollow chocolate bodies, comprising a conveying path, a plurality of conveying trolleys movable along said conveying path, a carrier on each of said conveying trolleys, a mould frame on such of said carriers for moulds for said chocolate bodies, said mould frames being individually rotatable in relation to said conveying trolley and including an upper and a lower frame part;

an installation for the opening and closing of said mould frames, in which said upper and lower frame parts are hinged together along a hinge axis and comprising engagement elements secured on both sides on said upper frame part and offset in relation to said hinge axis, means for holding fast said lower frame part to prevent rotation, a device having driven grippers capable of engaging with said engagement elements and rotatable about said hinge axis when said lower frame part is held fast.

18. An installation as claimed in claim 17, in which said grippers can be brought into and out of engagement with said engagement elements of said upper frame part both in the closed position of said mould frame and also in the open position of said mould frame.

19. An installation as claimed in claim 18, in which said grippers are formed as rail pieces along which said engagement elements of said upper frame part slide from one end to the other and can come into and out of engagement at each end.

20. An installation as claimed in claim 17, comprising two pivot arms arranged by pairs and pivotable about a pivot axis lying parallel with said hinge axis of said mould frame, said driven grippers being arranged on the free ends of said pivot arms and being able to act on said engagement elements of said upper frame part by pivoting in of said pivot arms, and after their rotational movement, rotating said upper frame part in relation to said lower frame part, being disengageable from said engagement elements by pivoting out of said pivot arms again.

21. An installation as claimed in claim 20, in which said pivot axis of said pivot arms lies approximately vertically beneath said frame hinge axis at a distance amounting to a multiple of the distance between said frame hinge axis and said engagement elements of said upper frame part, and said pivot arms are pivotable out of this position away from said lower frame part into a position in which said mould frame can be moved further without hinderance in the direction of said frame hinge axis.

22. An installation as claimed in claim 20, comprising a cylinder-and-piston drive arranged on said pivot arms and comprising a piston rod connected with each of said grippers, a toothed wheel, and a chain and a counter-wheel for driving each of said toothed wheels, said piston rod being in drive communication with said chains.

23. An installation as claimed in claim 22, in which said counter wheels are secured on a common shaft and said piston rod acts through a transverse rod on said chains at points which are situated close above said counter-wheels when said mould frame is closed and move away from said counter-wheels on opening of said mould frame.

24. An installation as claimed in claim 20, comprising a cylinder piston means driving said two pivot arms.

25. An installation as claimed in claim 17, comprising support rails for said lower part and the hinged-away upper part of said mould frame, on which said mould frame in the opened condition can be pushed further in the direction of said frame hinge axis.

26. In a system for the production of hollow chocolate bodies, comprising a conveying path, a plurality of conveying trolleys movable along said conveying path, a carrier on each of said conveying trolleys, a mould frame on each of said carriers for moulds for said chocolate bodies, said mould frames being individually rotatable in relation to said conveying trolley and including an upper and a lower frame part lockable to one another by locking elements,
and means for the unlocking and locking of said upper frame part, comprising said mould frames having spring means between said upper and lower frame parts for resisting a pressure force upon said upper frame part toward said lower frame part to allow locking elements, said spring means loading said locking elements in the locked position.

27. In a system for the production of hollow chocolate bodies, comprising a conveying path, a plurality of conveying trolleys movable along said conveying path, a carrier on each of said conveying trolleys, a mould frame on each of said carriers for moulds for said chocolate bodies, said mould frames being individually rotatable in relation to said conveying trolley and including an upper and a lower frame part lockable to one another by locking elements, and
an installation for the unlocking and locking of said upper frame part in relation to said lower frame part, said mould frames having means mutually springing them apart, and comprising means for supporting said lower frame part, a movable holding-down element arranged for pressing upon said upper frame part, a first controllable drive for moving said holding-down element, movable striking elements arranged for acting on said locking elements, and a second controllable drive for moving said striking elements, whereby said striking elements driven by said second controllable drive bring said locking elements out of and into their locking position.

28. An installation as claimed in claim 27, in which said holding-down element includes a pivotably-mounted, lever-like claw having a free end which engages said upper frame part and is connected with a cylinder-and-piston drive as said first controllable drive.

29. An installation as claimed in claim 27, in which said holding-down element includes a lever-like claw pivotably mounted about an approximately horizontal axis and having a free end which engages said upper frame part, said lever-like claw being connected with said first controllable drive and being arranged so that in the engaged position it is oriented approximately parallel with the upper side of said upper frame part.

30. An installation as claimed in claim 27, each of said mould frames having at least two pivotable locking elements, said striking element being seated on a pair of levers, each of said levers being pivotably mounted, and comprising a common drive element for said levers.

31. An installation as claimed in claim 30, comprising a toothed segment on each of said levers, and a common rack for said toothed segments, said rack being connected to said second controllable drive.

32. An installation as claimed in claim 31, each of said mould frames having an unlocking device in which pivotal movement of said locking elements for locking towards one another compresses said unlocking device and a locking device, said unlocking device having a first pair of said levers which pivot outwards for unlocking about two first pivot axes, a first narrow rack engaged by said toothed segments of said last named pair of levers, said first narrow rack being slidably mounted in the middle between said two levers, said locking device having a second pair of said levers which pivot inwards for locking about two second pivot axis, the distance between said two second pivot axes being longer than the distance between said two first pivot axes, and a second rack as said common rack engaged by said toothed segments of said levers, said second rack being slidably mounted in the middle between said two levers and being broader than said first narrow rack by an amount according to the longer distance between said second two pivot axes.

References Cited

UNITED STATES PATENTS

| | | | |
|---|---|---|---|
| 1,812,242 | 6/1931 | Jensen | 107—8.4 |
| 2,108,067 | 2/1938 | Lantinberg et al. | 107—8.4 |
| 3,212,129 | 10/1965 | Craig et al. | 18—43 |

FOREIGN PATENTS

| | | |
|---|---|---|
| 6,788 | 1927 | Australia. |

BILLY J. WHITE, *Primary Examiner.*

J. SHEA, *Assistant Examiner.*